US011934152B2

(12) United States Patent
Favre et al.

(10) Patent No.: US 11,934,152 B2
(45) Date of Patent: Mar. 19, 2024

(54) DEVICE FOR ILLUMINATING LUMINESCENT WATCH DISPLAYS

(71) Applicant: The Swatch Group Research and Development Ltd, Marin (CH)

(72) Inventors: Jérôme Favre, Neuchatel (CH); Cedric Nicolas, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 324 days.

(21) Appl. No.: 17/322,234

(22) Filed: May 17, 2021

(65) Prior Publication Data

US 2022/0113681 A1 Apr. 14, 2022

(30) Foreign Application Priority Data

Oct. 14, 2020 (EP) .................................... 20201797

(51) Int. Cl.
*G04B 19/32* (2006.01)
*G04B 5/02* (2006.01)
*G04B 27/00* (2006.01)
*G04D 7/00* (2006.01)

(52) U.S. Cl.
CPC ............... *G04B 19/32* (2013.01); *G04B 5/02* (2013.01); *G04B 27/007* (2013.01); *G04D 7/00* (2013.01)

(58) Field of Classification Search
CPC .......... G04D 7/00; G04D 7/004; G04D 7/009; G04B 19/32; G04B 5/02; G04B 5/00
See application file for complete search history.

(56) References Cited

U.S. PATENT DOCUMENTS

2006/0164821 A1 7/2006 Usui
2008/0247278 A1 10/2008 Walker et al.
2014/0013846 A1 * 1/2014 Decoux ................ G04B 47/042 73/579

(Continued)

FOREIGN PATENT DOCUMENTS

EP 3 579 061 A1 12/2019
JP 3154770 U 10/2009
WO WO 2004/034153 A2 4/2004

OTHER PUBLICATIONS

Glow.com, "What is 'glow in the dark' and how does it work?", 2018.*

(Continued)

*Primary Examiner* — Renee S Luebke
*Assistant Examiner* — Matthew Hwang
(74) *Attorney, Agent, or Firm* — Oblon, McClelland, Maier & Neustadt, L.L.P.

(57) ABSTRACT

A device for illuminating luminescent watch displays containing luminophore material, including a case arranged to receive at least one receptacle for receiving at least one watch, the device including a illuminating device arranged to light up the displays of each said watch. The illuminating device include a control device and a time base, and at least one light source capable of exciting said luminophore material for a pre-determined charge time, or corresponding to a wearing duration chosen by the user via a control device included in the device, and watch self-winding device, including at least one such illumination device, and universal device for winding and setting the hands of a watch, including such a watch self-winding device.

15 Claims, 7 Drawing Sheets

(56) References Cited

U.S. PATENT DOCUMENTS

| | | | | |
|---|---|---|---|---|
| 2017/0263011 | A1 * | 9/2017 | Yalniz | G06V 20/10 |
| 2019/0121297 | A1 | 4/2019 | Buehler et al. | |

OTHER PUBLICATIONS

European Search Report dated Feb. 17, 2021 in European Application 20201797.6 filed Oct. 14, 2020 (with English Translation of Categories of Cited Documents), 3 pages.

* cited by examiner

DEVICE FOR ILLUMINATING LUMINESCENT WATCH DISPLAYS

CROSS-REFERENCE TO RELATED APPLICATION

This application claims priority to European Patent Application No. 20201797.6 filed on Oct. 14, 2020, the entire disclosure of which is hereby incorporated herein by reference.

FIELD OF THE INVENTION

The invention relates to a device for illuminating luminescent watch displays containing luminophore material, comprising a case arranged to receive at least one receptacle for receiving at least one watch, said device comprising illuminating means arranged to light up said displays of each said watch.

The invention further relates to a watch self-winding device comprising at least one such illumination device.

The invention further relates to a universal device for winding and setting the hands of a watch, comprising such a watch self-winding device.

The invention relates to the field of intelligent devices, such as intelligent winding mechanisms, for maintaining watches such that they are instantly able to operate, display the correct time, and have a sufficient power reserve to be worn for a few hours, while preventing any premature wear of the watch by incessant and unnecessary winding operations.

BACKGROUND OF THE INVENTION

The European patent document No. EP3339984 filed by The Swatch Group Research and Development Ltd describes an intelligent device for winding watches. This device is constantly being improved upon.

In particular, one of the developments relates to an intelligent winding mechanism, the main purpose whereof is to limit the reloading of the automatic barrel of the watch, as well as to correct the time displayed by subjecting the watch to a modulated motion imparted thereto by an oscillator, following a reading of the time by recognition of the hands in relation to the dial.

This reading of the time is a technically challenging step, largely because of the wide variety of existing dial and hand configurations. Currently, only known watches, pre-programmed as a function of the configuration of the displays thereof in relation to the dials thereof, are easy to recognise. Watches whose displays are formed by hands that are very different from one another in size and proportion can also be recognised by visioning systems, provided that no optical interference is present, for example, as a result of a too great similarity between the decoration of the dial and that of the hands moving in front of or opposite this dial.

Moreover, the lighting conditions when the time is being read by visioning means are strict in order to prevent reflections on the crystal of the watch.

One effective way of eliminating these reflections is to cap the winding mechanism with a dull white dome, as used on a larger scale by professional photographers, and the combination of such a dome and a light ring maximises the quality of the images and minimises interfering reflections. In fact, no external light should be able to penetrate the dome, which prevents the user from being able to view his/her watch when it is placed on the winding mechanism.

This is detrimental in the case of a business looking to present a watch to customers while maintaining optimum service availability for demonstration purposes.

Any improvement that allows the display to be recognised accurately, while allowing the user to view his/her watch, is thus of interest.

SUMMARY OF THE INVENTION

The invention aims to improve the conditions for optically monitoring the state of a watch.

The invention thus relates to a device for illuminating luminescent watch displays containing luminophore material according to claim 1.

The invention further relates to a watch self-winding device comprising at least one such illumination device.

The invention further relates to a universal device for winding and setting the hands of a watch, comprising such a watch self-winding device.

BRIEF DESCRIPTION OF THE DRAWINGS

Other features and advantages of the invention will be better understood upon reading the following detailed description given with reference to the accompanying drawings, in which.

DETAILED DESCRIPTION OF THE PREFERRED EMBODIMENTS

The invention proposes producing a device 100 for illuminating luminescent watch displays 201, 202 containing luminophore material, for use in an intelligent winding mechanism, or in a similar apparatus including a function for reading the state of the watch, and in particular the time displayed thereby at a given moment, and including in this device the recharging of the indexes, appliques, hands and the like with energy, hereinafter referred to as a whole by the term displays, which are covered with a luminophore material, in particular “superluminova”, by lighting them up, at least momentarily, with a suitable light source, and in particular LEDs, preferably ultraviolet LEDs.

Figure 2:
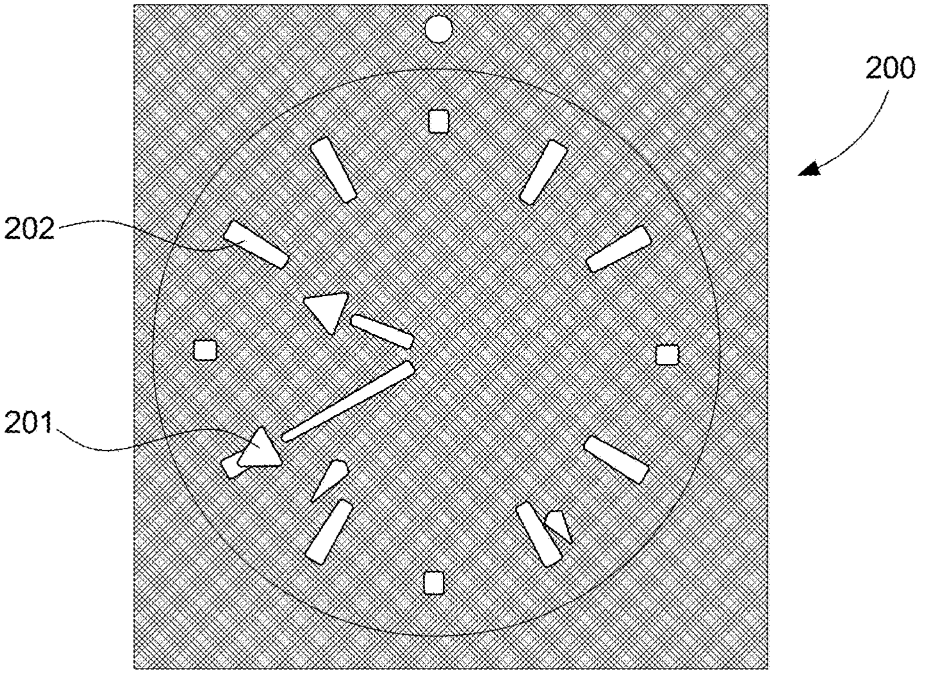
FIG. 2 diagrammatically shows a front view of a watch comprising luminescent displays made of luminophore material, in this case indexes and hands, as visible after being recharged with luminous energy and after extinguishing any source of luminous energy in the case, and as it presents itself to a visioning means such as a camera for monitoring the state thereof and the time displayed thereby.
Figure 3:
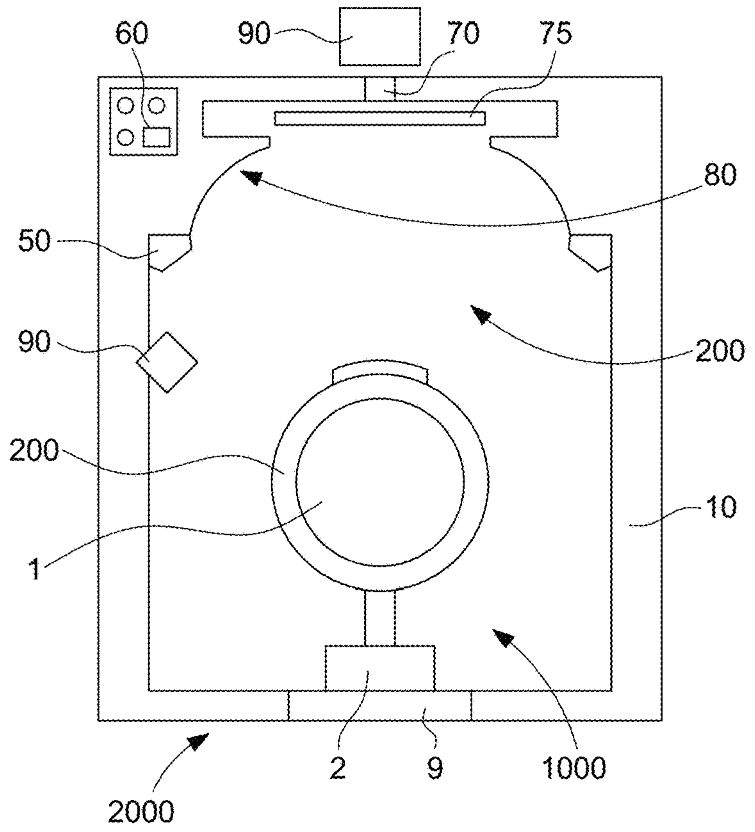
FIG. 3 very diagrammatically shows a sectional view of a universal device for winding and setting the hands of a watch, comprising a watch self-winding device according to FIG. 1.
Figure 4:
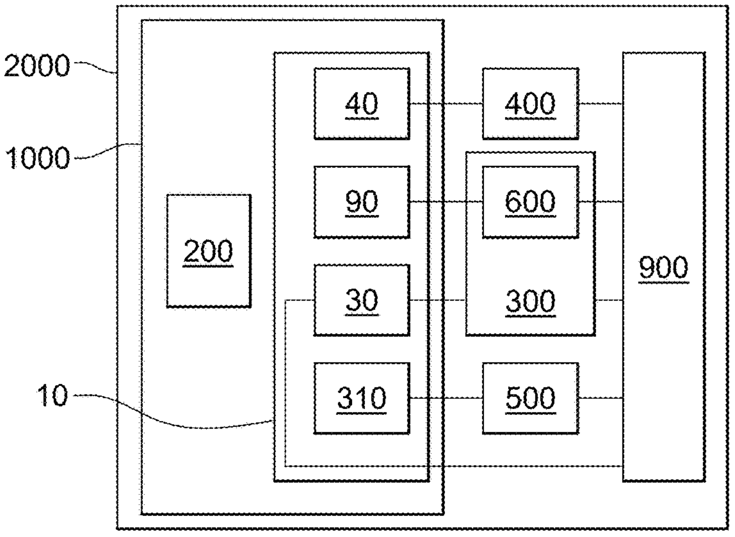
FIG. 4 is a block diagram showing the interactions between the main control, command and acquisition means comprised in the universal device for winding and setting the hands of a watch, the watch self-winding device and the illumination device.
Figure 5:
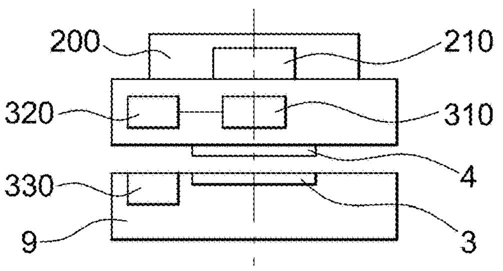
FIG. 5 very diagrammatically shows a partial, sectional view of a detail of the lower part of the watch self-winding device according to FIG. 1.
Figure 6:
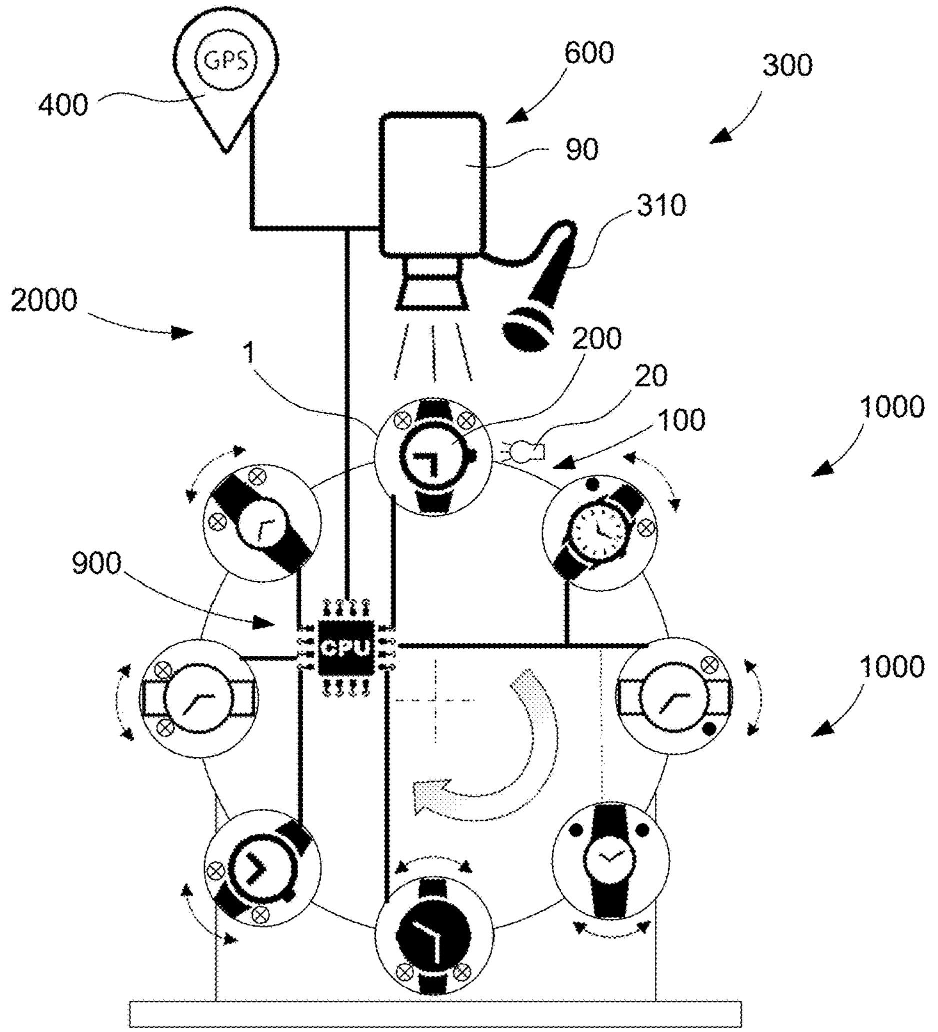
FIG. 6 diagrammatically shows another universal device for winding and setting the hands of a watch, comprising a watch self-winding device which comprises a drum carrying a plurality of watches which are successively presented in front of lighting means and acoustic and optical detection means.
Figure 7:
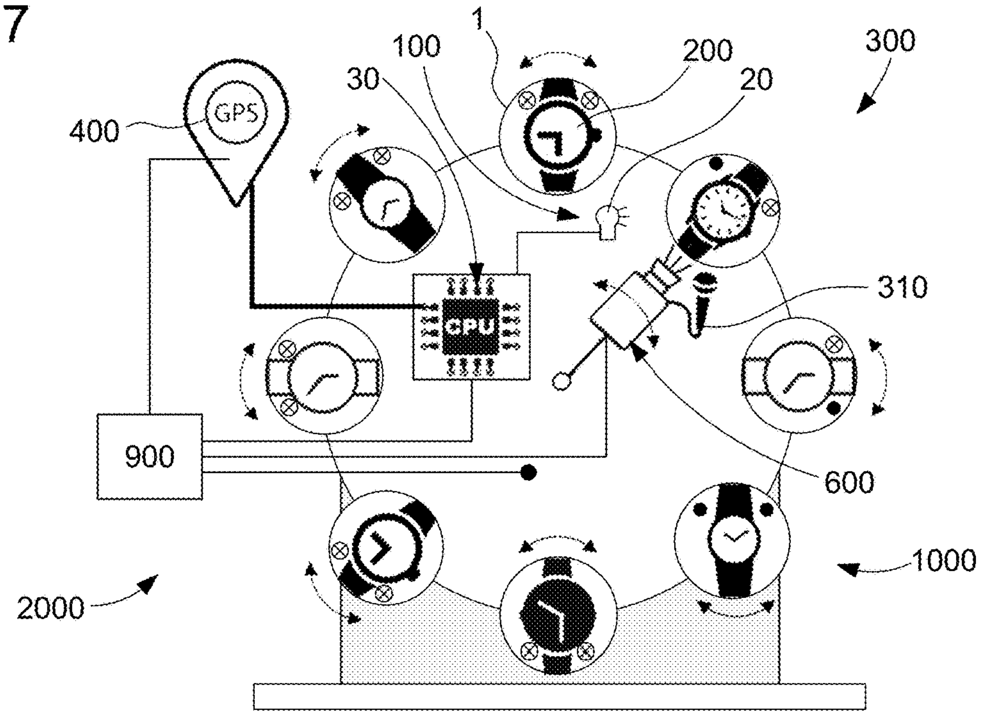
FIG. 7 shows an alternative embodiment to the device in FIG. 6 having a similar architecture.
Figure 8:
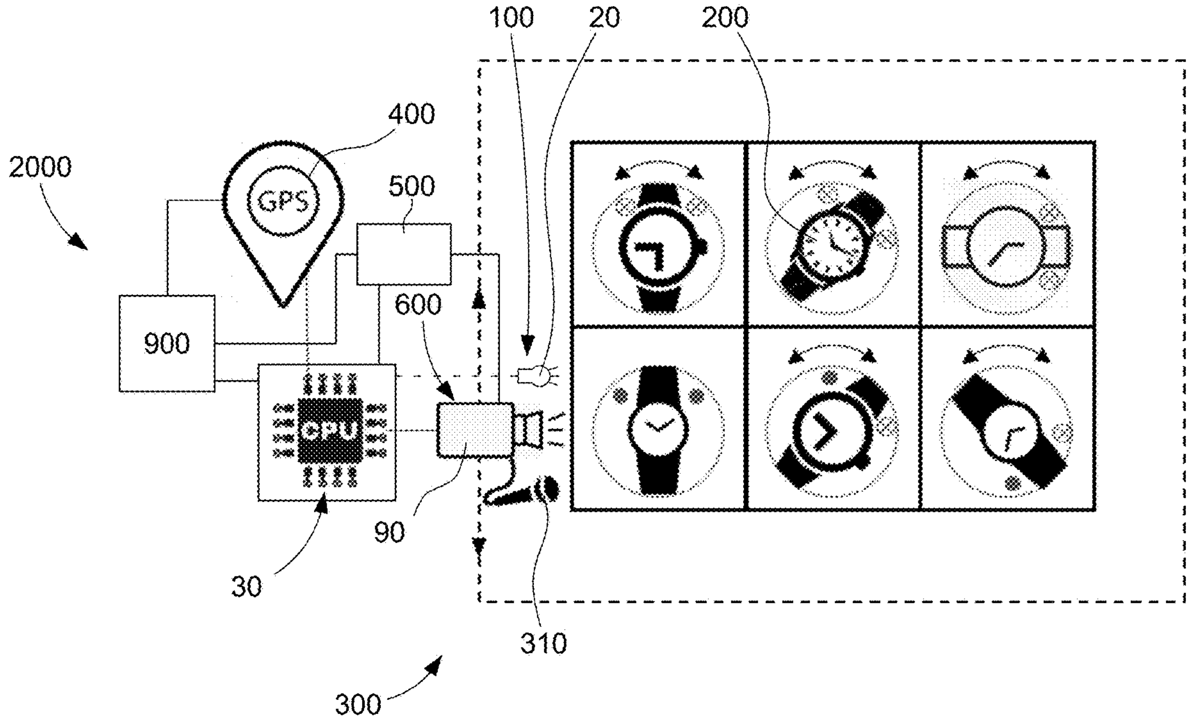
FIG. 8 diagrammatically shows another universal device for winding and setting the hands of a watch, comprising a watch self-winding device of the matrix type carrying a plurality of watches presented successively in front of lighting means and acoustic and optical detection means.
Figure 9:
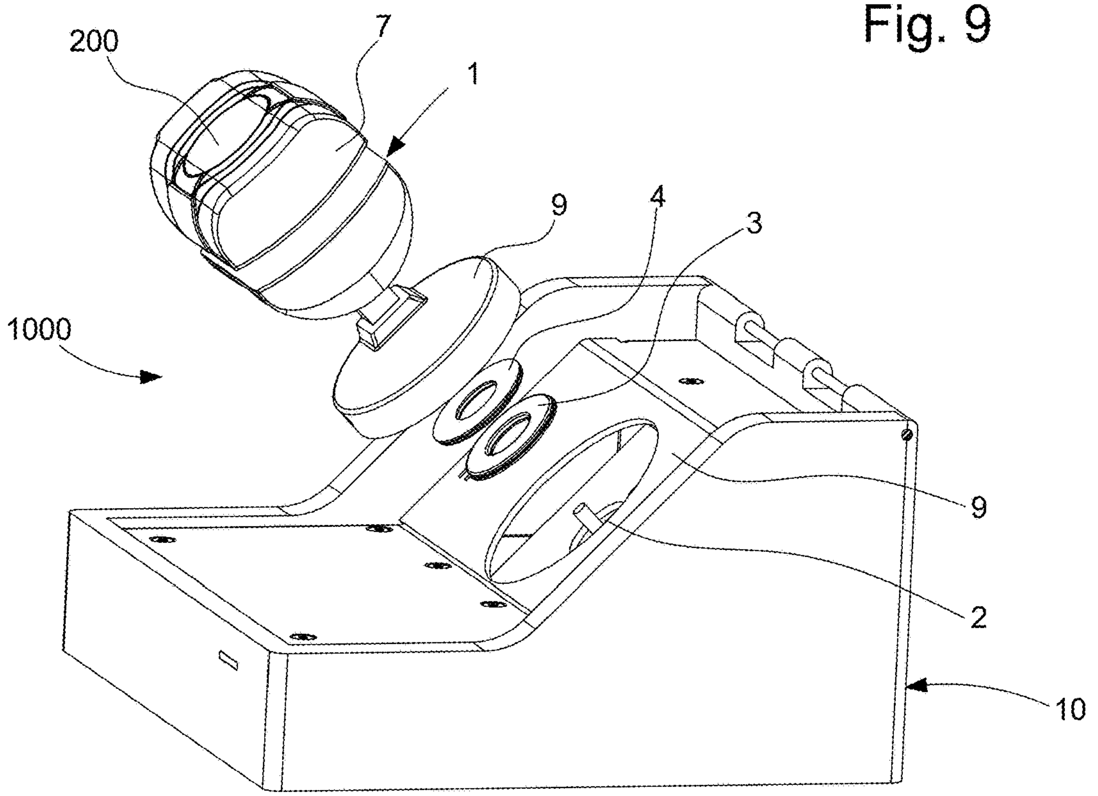
FIG. 9 diagrammatically shows a partial and exploded perspective view of the watch self-winding device in FIG. 1.
Figure 10:
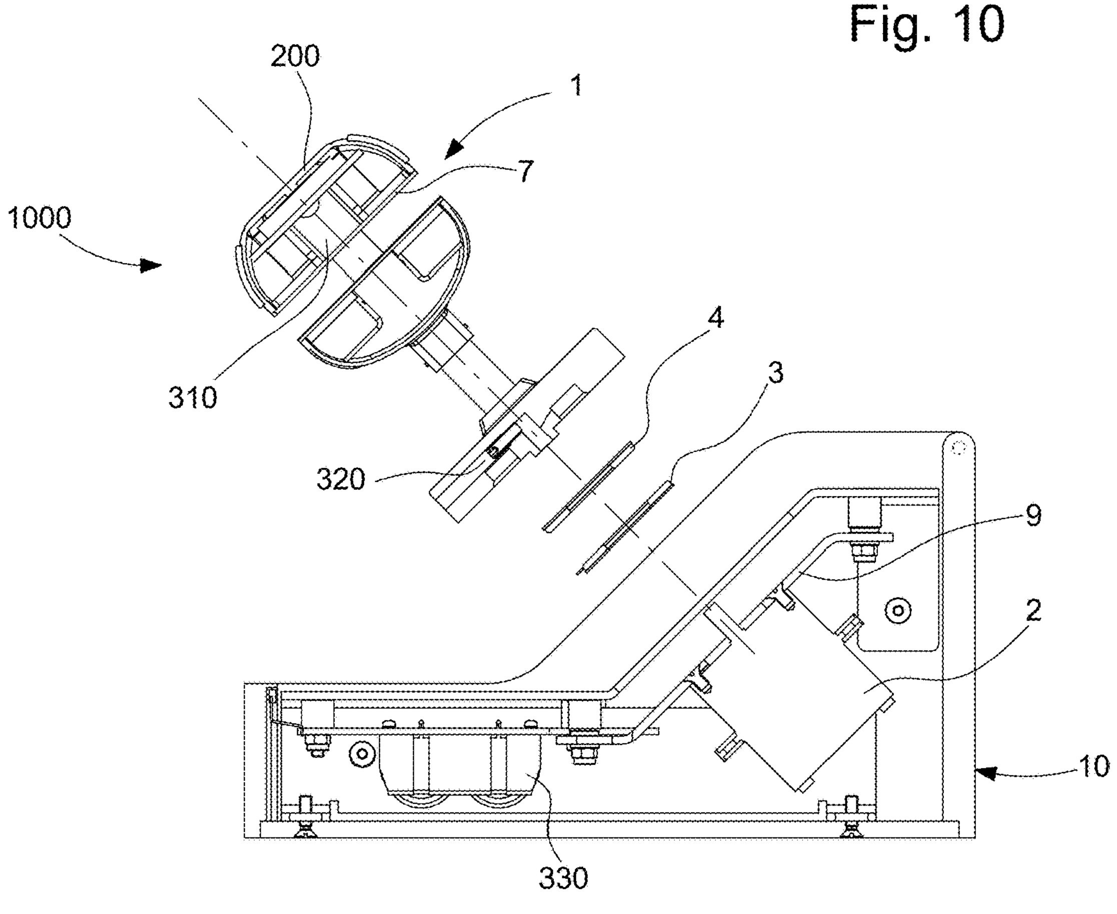
FIG. 10 diagrammatically shows a partial and exploded sectional view of the watch self-winding device in FIG. 1.
Figure 11:
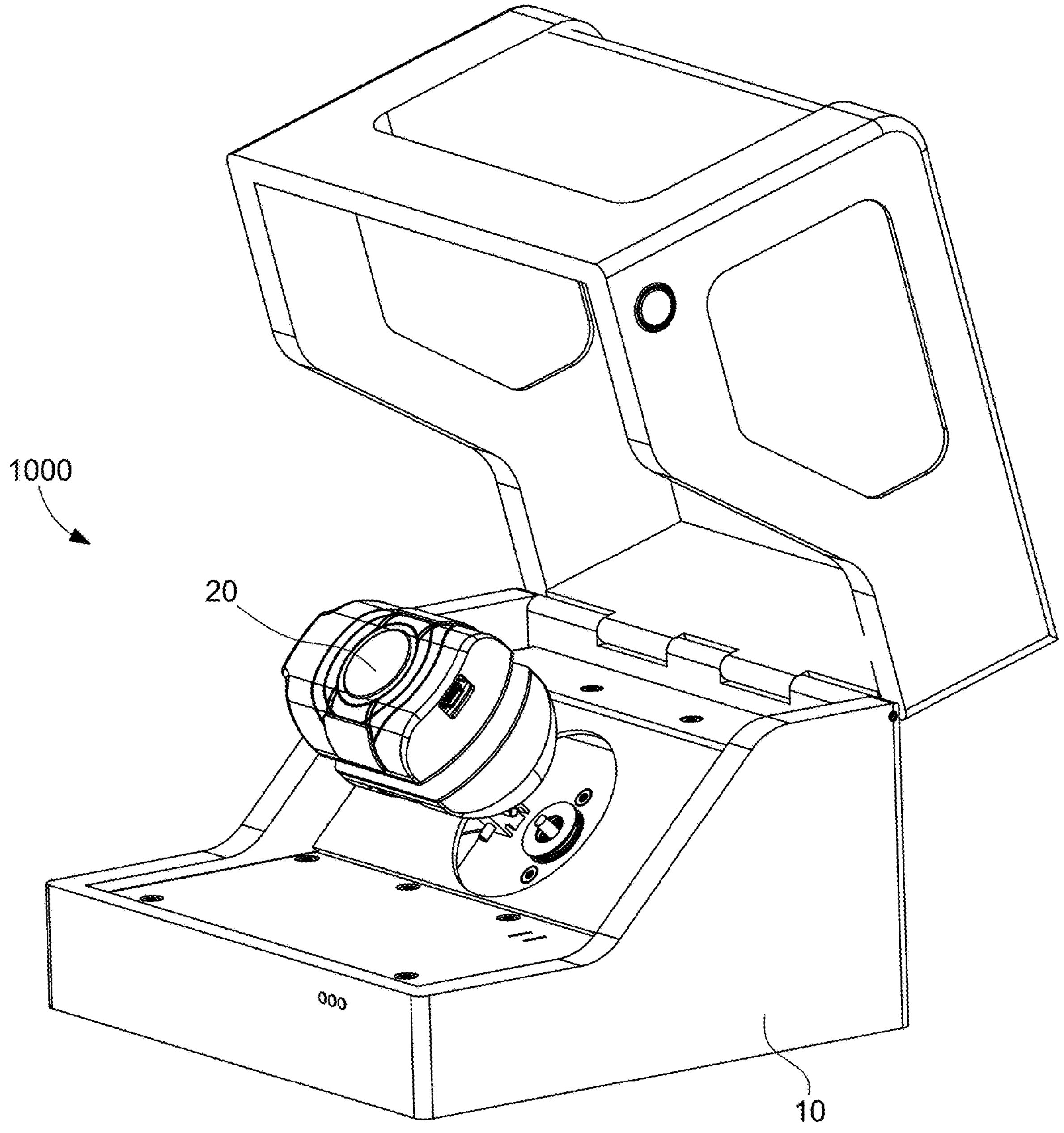
FIG. 11 diagrammatically shows an exploded perspective view of the watch self-winding device in FIG. 1.
Figure 12:
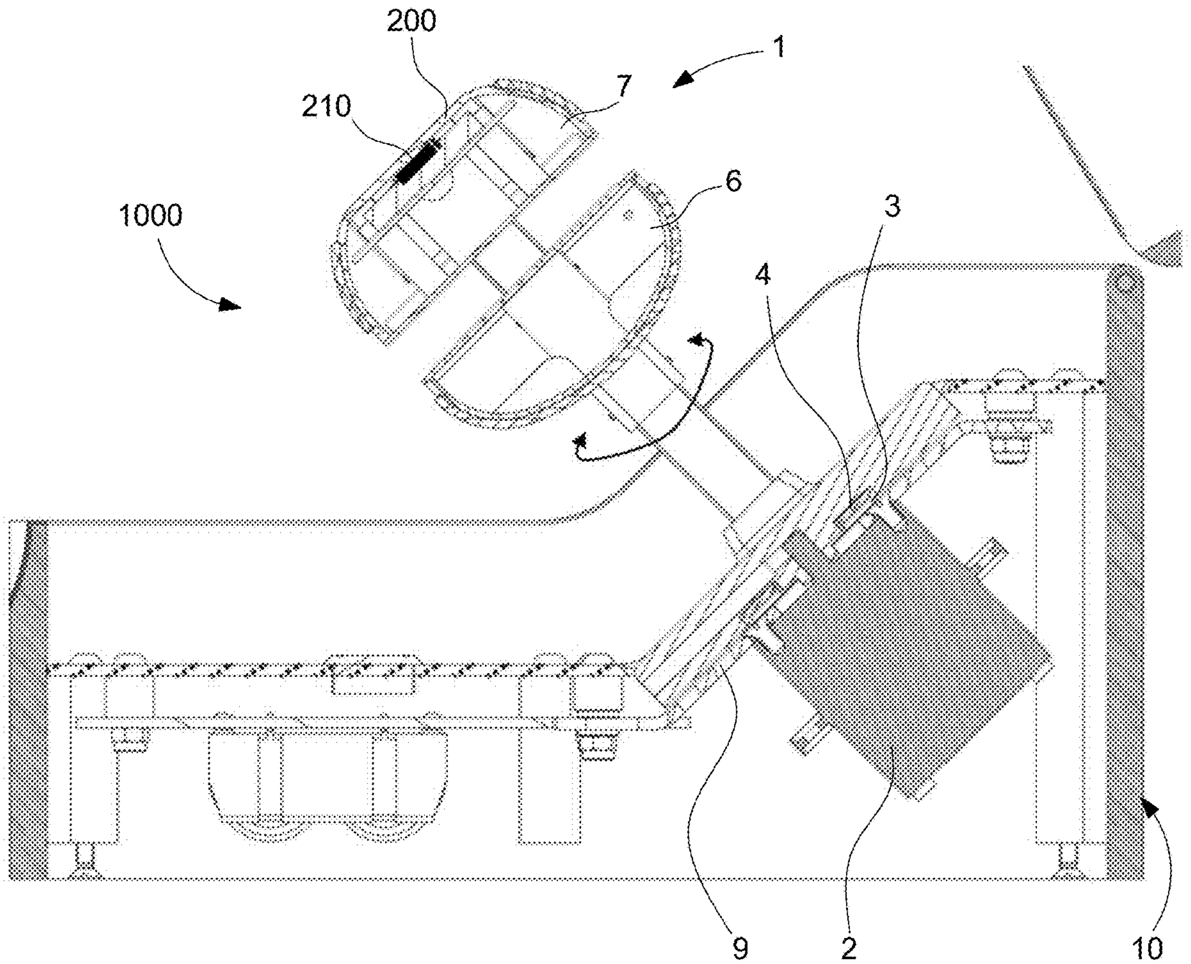
FIG. 12 diagrammatically shows a partial, sectional view of the watch self-winding device in FIG. 1.

The invention proposes using sufficiently powerful lighting, preferably ultraviolet lighting, to firstly recharge such a luminophore material, in particular “superluminova”, of the luminescent displays, in particular of the indexes 202 and of the hands 201 in the non-limiting example in FIG. 2, and then secondly switching off all of the light sources, so that only the signal corresponding solely to the indexes 202 and hands 201 remains, as shown in FIG. 2, when an image is captured by a camera 90 or the like, and thus so as to filter out a lot of noise caused by the patterns on the dial or the decoration of the watch, or even by other moving parts not coated with luminophore material.

This solution furthermore allows the luminophore material, in particular “superluminova”, to be recharged so that the user has a watch that is easy to read when he or she picks it up in the morning upon waking, for example. An intelligent winding mechanism comprising control means connected to a time base can easily monitor the events of placing a watch on its winding stand, and removing the same watch from the same stand, in order to determine the average time at which the watch is removed from its stand (for example “never after 7:30 a.m.”), and anticipate the start of recharging as a function of this time, so as to synchronise the maximum energy recharge with the average time of removal. This energy recharge can comprise recharging the motive energy sources of the watch, the barrels or the like, and recharging the luminous energy sources which are the subject of the present invention.

FIG. 2 thus shows the appearance of a watch previously lit up with white light, in the state in which it is no longer subjected to any lighting, with only the elements such as hands 201, indexes and appliques 202 containing luminophore material such as “superluminova” or the like, previously maximally recharged with luminous energy, being visible.

Thus, the invention relates to a device 100 for illuminating luminescent watch displays 201, 202 containing luminophore material.

This illumination device 100 comprises a case 10, which is arranged to receive at least one receptacle 1 for receiving at least one watch 200.

The device 100 comprises illuminating means 20, which are arranged to light up the displays 201, 202, of each watch 200.

According to the invention, these illuminating means 20 comprise a first controller 30 and a time base 40, and at least one light source 50 capable of exciting the luminophore material for a pre-determined charge time, or corresponding to a wearing duration chosen by the user via a second controller 60 comprised in the device 100.

More particularly, this device 100 comprises at least one camera 90 for capturing an image of a watch 200 placed on such a receptacle 1.

Even more particularly, the first controller 30 is arranged to prepare a capture of an image of a watch 200 at a given moment by such a camera 90 placed in the case 10 or in front of a viewing port 70 comprised in the case 10. Moreover, the first controller 30 determines the luminescent displays 201, 202, to be illuminated, and define the duration of activation thereof by an illumination from this at least one light source 50, before this image capture, to ensure the selectivity and the detection of the respective positions thereof.

More particularly, the light source 50 emits ultraviolet radiation.

Figure 1:
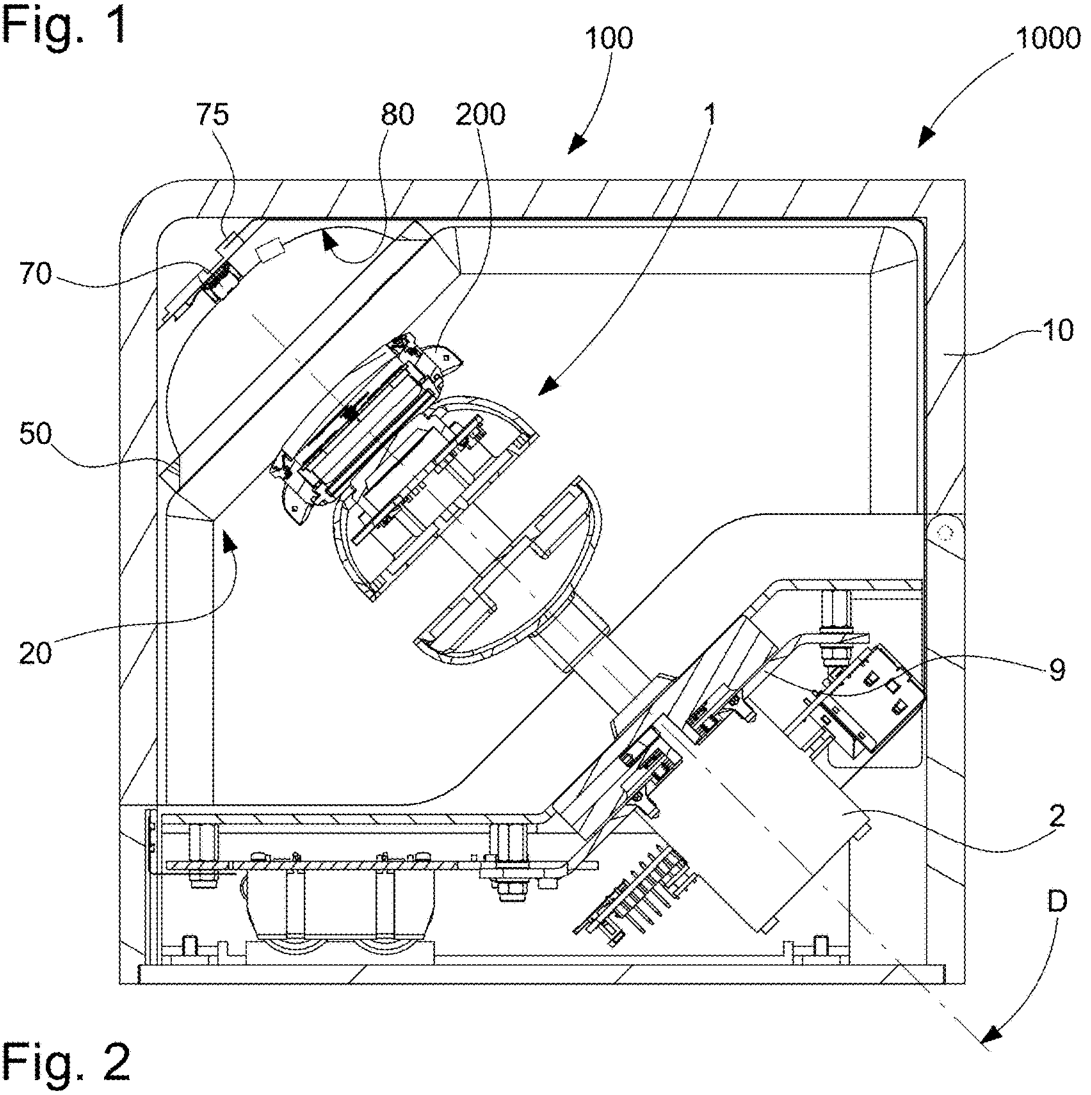
FIG. 1 diagrammatically shows a sectional view of a watch self-winding device comprising such an illumination device; this watch self-winding device is a simple, rotary device carrying a watch on a receptacle driven by a rotational motion, and which is well suited for use with a single watch; the receptacle is in a closed case provided with a concealable viewing port, and a light source, controlled by control means, is integrated into this case.

FIG. 1 shows the positioning of such a light source 50, in particular a ring of white and/or ultraviolet light, for recharging the luminescent displays with energy.

More particularly, the case 10 comprises an enclosure that is closed and impervious to light, with the exception of a viewing port 70 facing each receptacle 1 in order for the user to view a watch 200.

More particularly, each viewing port 70 is equipped with a shutter 75, which is capable of moving at will to prevent light from penetrating the case 10. Even more particularly, the closing or opening of this shutter 75 is controlled by the first controller 30.

Alternatively, the shutter is fixed, and in particular comprises an optical valve that switches from a transparent mode to allow the user to view his/her product, to an opaque mode to significantly reduce the penetration of interfering light, and for example, to display an image of the product or the brand logo. This configuration makes it possible, in a shuttered state, to significantly reduce or even prevent the penetration of light into the case 10, and, if desired, to display a logo or an image of a watch 200 visible through the viewing port 70, and in another viewing state, to allow the watch 200 to be viewed.

More particularly, the light source 50 is substantially annular.

More particularly, a light source 50 surrounds each viewing port 70 to illuminate the corresponding receptacle 1.

More particularly, the case 10 internally comprises a dull dome 80, or a dome comprising anti-reflection treatment, in order to prevent the presence of reflections when an image of a watch 200 is captured by a camera 90 placed inside the case 10 or in front of a viewing port 70.

More particularly, the first controller 30 is arranged to prevent any luminous emission when an image of a watch 200 is captured by a camera 90 placed inside the case 10 or in front of a viewing port 70.

More particularly, the first controller 30 is arranged to prevent any image of a watch from being captured by a camera 90 when a shutter 75 is open.

More particularly, the first controller 30 is arranged to control the closing of each shutter 75 when an image of a watch is captured by a camera 90.

More particularly, the device 100 comprises a camera 90 for capturing an image of a watch placed on a receptacle 1.

The invention further relates to a watch self-winding device 1000, in particular having a rotational motion, however without being limited thereto, comprising a base 9 carrying a motor 2 for driving, in particular in rotation, however without being limited thereto, at least one receptacle 1 which is capable of moving with respect to the base 9. This receptacle 1 is arranged so as to receive a mechanical watch or an electronic watch with a mechanical power source in a winding position, and comprises at least one upper watch holder 7 comprising a receiving surface for direct contact with a watch 200 fixed to the receptacle 1.

More particularly, the device 1000 comprises at least one such illumination device 100, which is arranged to illuminate each watch 200 placed on a receptacle 1 comprised in the device 1000.

The invention further relates to a universal device 2000 for winding and setting the hands of a watch 200 comprising an oscillating resonator 210 arranged to generate an oscillation at a nominal frequency N0.

This universal device 2000 comprises means for rewinding and correcting the state of the watch 200, comprising such a watch self-winding device 1000.

This universal device 2000 comprises state-measuring means 300 for measuring the state of the watch 200, relative to a reference clock 400 to which the state-measuring means 300 refer.

These state-measuring means 300 comprise a visioning system 600 comprising at least one camera 90 of the illumination device 100. The time base 40 of the illumination device 100 is also coupled to the reference clock 400.

More particularly, the universal device 2000 comprises stop-monitoring means 500, which are arranged to detect the stopping or the running of an oscillating resonator 210 of a watch 200, and a main controller 900, with which the first controller 30 of the illumination device 100 is interfaced. The main controller 900 controller all of the monitoring, acquisition and control means of the universal device 2000. They are in particular arranged so that, when a stop is detected by the stop-monitoring means 500, they identify, according to information transmitted by the state-measuring means 300, the stop time displayed by the watch 200 in the stop position thereof. The main controller 900 then calculates the time remaining until synchronisation between the actual time indicated by the reference clock 400 and the stop time, so that, upon expiry of the remaining time, the controller 900 activates the watch self-winding device 1000 in order to recharge the energy storage means of the watch 200 with motive energy, also known as rewinding.

More particularly, at least one receptacle 1 comprises at least one microphone 310 for listening to a watch 200, and at least one embedded electronic circuit 320 housed inside the receptacle 1 for processing the signal from each microphone 310. Moreover, the watch self-winding device 1000 comprises, in order to power each embedded electronic circuit 320, at least one first coil 3 fixed to the base 9 or to the motor 2, and powered by a static energy source carried or relayed by the base 9, and at least one second coil 4 embedded in the receptacle 1 and arranged to cooperate with at least one first coil 3 and arranged to transmit energy to each embedded electronic circuit 320, at least one embedded electronic circuit 320 whereof being arranged to exchange information with at least one static electronic circuit 330 housed at the base 9.

The universal device 2000 thus combines all of the means for receiving a rate-setting device and/or a state-setting device.

When setting the rate, the universal device 2000 can incorporate a servo device for adjusting the rate of a watch comprising a conventional oscillator arranged to generate an oscillation at a nominal frequency N0 with an initial variation of rate value DI. This servo device comprises a master oscillator arranged to generate an excitation oscillation at an excitation frequency NE, constituting a reference, which is equal to the nominal frequency N0, or to an integer multiple of the nominal frequency N0, with a master variation of rate value AM with respect to a reference, which is smaller than the initial variation of rate value DI. Moreover, this servo device is arranged to subject the watch to an excitation oscillation generated by the master oscillator and/or to a modulated motion generated by the master oscillator, until synchronisation thereof.

To set the state, the universal device 2000 can incorporate a state-correction device for correcting the state of a similar watch. The state-correction device comprises a state-correcting oscillator, which is arranged to generate an oscillation at a correction frequency NC, and is arranged to subject the entire watch or respectively the entire movement to an oscillation generated by the master oscillator and/or to a modulated motion generated by the state-correcting oscillator, until the required display state is reached.

What is claimed is:

1. An illumination device for illuminating luminescent watch displays containing luminophore material, comprising:

a case arranged to receive at least one receptacle for receiving at least one watch, said device comprising illuminating means arranged to light up said displays of each said watch, wherein said illuminating means comprise a first controller and a time base, and at least one light source capable of exciting said luminophore material for a pre-determined charge time, or corresponding to a wearing duration chosen by the user via a second controller comprised in said device, wherein said first controller is arranged to turn off said at least one light source to prevent charging said luminophore material when an image of a watch is captured by a camera placed inside said case or in front of a viewing port comprised in said case.

2. The illumination device according to claim 1, wherein said device comprises at least one camera for capturing an image of a watch placed on said at least one receptacle.

3. The illumination device according to claim 2, wherein said first controller is arranged to prepare a capture of an image of a watch at a given moment by said camera placed in said case or in front of a viewing port of said case, and determine said luminescent displays to be illuminated, and define the duration of activation of the luminescent displays by an illumination from said at least one light source, before said image capture, to ensure the selectivity and the detection of the respective positions thereof.

4. The illumination device according to claim 2, wherein said first controller is arranged to prevent any image of a watch from being captured by said camera when a shutter is open.

5. The illumination device according to claim 2, wherein said first controller is arranged to control the closing of a shutter when an image of a watch is captured by said camera.

6. The illumination device according to claim 1, wherein said at least one light source emits ultraviolet radiation.

7. The illumination device according to claim 1, wherein said case comprises an enclosure that is closed and impervious to light, with the exception of a viewing port facing each said receptacle in order for the user to view a watch.

8. The illumination device according to claim 7, wherein each viewing port is equipped with a shutter, which is configured to be moved to prevent light from penetrating said case.

9. The illumination device according to claim 7, wherein each viewing port is equipped with a shutter in the form of an optical valve so that, in a shuttered state, it significantly reduces or prevents light from penetrating said case and displays a logo or an image of said watch visible through said viewing port, and in another viewing state, allows said watch to be viewed.

10. The illumination device according to claim 1, wherein said at least one light source is substantially annular.

11. The illumination device according to claim 10, wherein said at least one light source surrounds each said viewing port to illuminate the corresponding receptacle.

12. The illumination device according to claim 1, wherein said case internally comprises a dull dome, or a dome comprising anti-reflection treatment, in order to prevent the presence of reflections when an image of a watch is captured by a camera placed inside said case or in front of a viewing port comprised in said case.

13. A watch self-winding device comprising:

a base carrying a motor for driving at least one mobile receptacle in rotation relative to said base, wherein the at least one mobile receptacle is arranged so as to receive a mechanical watch or an electronic watch with a mechanical power source in a winding position, and comprises at least one upper watch holder comprising a receiving surface for direct contact with a watch fixed to said receptacle; and the illumination device according to claim 1, arranged to illuminate each watch placed on said at least one mobile receptacle comprised in said device.

14. A device for winding and setting the hands of a watch comprising an oscillating resonator arranged to generate an oscillation at a nominal frequency N0, said device being configured to rewind and correct the state of said watch, comprising the watch self-winding device according to claim 13, said device comprising a state-measuring structure configured to measure the state of said watch, relative to a reference clock to which said state-measuring structure refers, which comprise a visioning system comprising at least one camera of said illumination device, and to which is coupled said time base of said illumination device wherein said device is configured to detect the stopping or the running of said oscillating resonator of a watch, and a main controller, with which said first controller of said illumination device is interfaced, and which is arranged so that, when a stop is detected, the main controller identifies, according to information transmitted by said state-measuring structure, the stop time displayed by said watch in the stop position thereof, and calculates the time remaining until synchronisation between the actual time indicated by said reference clock and said stop time, and, upon expiry of said remaining time, the main controller activates said watch self-winding device in order to rewind the energy storage of said watch.

15. The device according to claim 14, wherein said at least one mobile receptacle comprises at least one microphone for listening to said at least one watch, and at least one embedded electronic circuit housed inside said at least one mobile receptacle for processing the signal from each said microphone, and wherein said device comprises, in order to power each said embedded electronic circuit, at least one first coil fixed to said base or to said motor, and powered by a static energy source carried or relayed by said base, and at least one second coil embedded in said at least one mobile receptacle and arranged to cooperate with said at least one first coil and arranged to transmit energy to each said embedded electronic circuit, said at least one embedded circuit whereof being arranged to exchange information with at least one static electronic circuit housed at said base.

* * * * *